United States Patent [19]
Malone

[11] Patent Number: 5,682,796
[45] Date of Patent: Nov. 4, 1997

[54] PUSH PULL CONTROL WITH OPPOSING COLLET ADJUSTMENT

[75] Inventor: David Malone, Lapeer, Mich.

[73] Assignee: Teleflex Incorporated, Plymouth Meeting, Pa.

[21] Appl. No.: 640,616

[22] Filed: May 2, 1996

[51] Int. Cl.⁶ .................................................. F16G 11/02
[52] U.S. Cl. .................. 74/502.4; 24/136 R; 403/314; 403/195; 248/74.1
[58] Field of Search .......................... 74/502.4, 502.6; 248/56, 74.1; 24/136 R; 403/314, 196, 195, 192

[56] References Cited

U.S. PATENT DOCUMENTS

| 2,041,385 | 5/1936 | Van Laanen, Jr. | 74/502.6 X |
| 2,166,458 | 7/1939 | Berndt et al. | 403/314 X |
| 2,648,883 | 8/1953 | Dupre | 403/314 X |
| 3,781,908 | 12/1973 | Tullos | |
| 3,952,377 | 4/1976 | Morell | |
| 4,154,545 | 5/1979 | Pinto et al. | 24/136 R X |
| 4,744,769 | 5/1988 | Thal | 24/136 R X |

FOREIGN PATENT DOCUMENTS

| 177806 | 8/1953 | Germany | 403/314 |
| 178112 | 9/1953 | Germany | 24/136 R |
| 872864 | 10/1981 | U.S.S.R. | 24/136 R |

Primary Examiner—Charles A. Marmor
Assistant Examiner—Mary Ann Battista
Attorney, Agent, or Firm—Howard & Howard

[57] ABSTRACT

The remote control assembly includes an adjustment mechanism for adjustment along the longitudinal axis which generically includes opposed and radially outwardly tapered wedge or conical sections (16) and a pair of female conical ramps (18) in engagement with the conical wedges (16). Each of the conical wedges (16) is paired with one of the ramps (18) for wedging action with the associated ramp (18) in response to an axial force applied to the paired one of the ramps (18) to create radial binding forces to prevent axial movement along the longitudinal axis in the direction of the applied axial force. In the embodiment of FIGS. 1–3, the small diameter ends (20) are connected together by a snap-together connection section (28–30) connecting the conical wedges together whereas in the embodiment of FIGS. 4 and 5, the small diameter ends (20) of the conical wedges (16) are integrally connected together by an integral section (24).

7 Claims, 2 Drawing Sheets

PUSH PULL CONTROL WITH OPPOSING COLLET ADJUSTMENT

TECHNICAL FIELD

The subject invention relates to motion transmitting remote control assemblies of the type for transmitting motion in a curved path by a motion transmitting core element movably supported in a conduit.

BACKGROUND OF THE INVENTION

The assemblies to which the subject invention relates are used extensively in the automotive industry. Typically, such a control assembly is routed through the vehicle from the instrument panel to a remote device to be controlled. As the conduit is routed in a curved or circuitous path through the vehicle with the conduit anchored to the vehicle support structure and the opposite ends of the core element connected to the input and output control members, it is necessary to either adjust the overall length or the conduit or the overall length of the core element to adjust the input and output control members to the proper positions relative to one another. It is also frequently necessary to support the conduit midway along its length with such supports being adjustable axially along the conduit for positioning for attachment to a fixed support structure. Various adjustment design philosophies are known in the prior art for accomplishing such adjustments in remote control assemblies; nevertheless, there is a constant need for a new design philosophy implementing a new combination of components in an adjustment mechanism for such a motion transmitting remote control assembly.

The periphery of the subject invention is, at least, in part defined by U.S. Pat. Nos. 3,781,908 to Tullos and 3,952,377 to Morell.

SUMMARY OF THE INVENTION AND ADVANTAGES

A motion transmitting remote control assembly of the type for transmitting motion in a curved path by a motion transmitting core element movably supported in a conduit which defines the longitudinal axis of the control assembly. An adjustment mechanism for adjustment along the longitudinal axis includes opposed and radially outwardly tapered wedges and a pair of ramps in engagement with the wedges with each of the wedges being paired with one of the ramps for wedging action therewith in response to an axial force applied to the paired one of the ramps to create radial binding forces to prevent axial movement along the longitudinal axis in the direction of the applied axial force.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
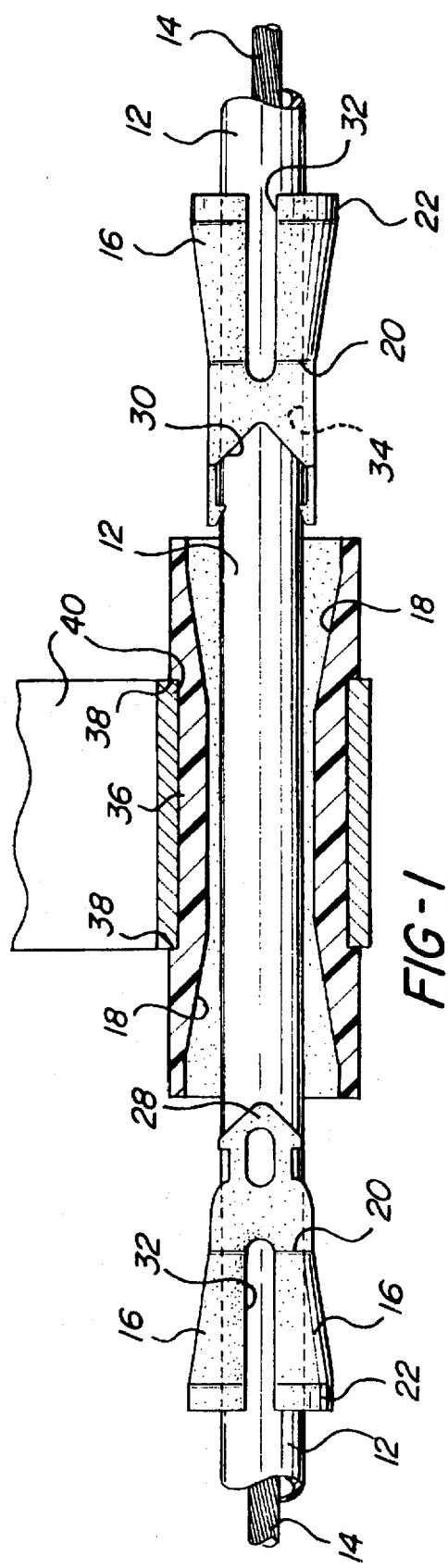
FIG. 1 is an exploded fragmentary view, partially in cross section, of a first embodiment.

Referring to the Figures, wherein like numerals reference like or corresponding parts throughout the several views, a motion transmitting remote control assembly is generally shown in the Figures. The motion transmitting remote control assembly is of the type for transmitting motion in a curved path by a motion transmitting core element 14 movably supported by a conduit 12 which defines the longitudinal axis of the control assembly. The conduit may be of the well known type which comprises a plastic inner tubular member surrounded by wires or filaments disposed on a long helical lead and encased in an extruded plastic casing. The core element typically comprises a wire or a stranded cable.

The remote control assembly includes an adjustment mechanism for adjustment along the longitudinal axis which genetically includes opposed and radially outwardly tapered wedges 16 and a pair of ramps 18 in engagement with the wedges 16. Each of the wedges 16 is paired with one of the ramps 18 for wedging action with the associated ramp 18 in response to an axial force applied to the paired one of the ramps 18 to create radial binding forces to prevent axial movement along the longitudinal axis in the direction of the applied axial force.

Figure 4:
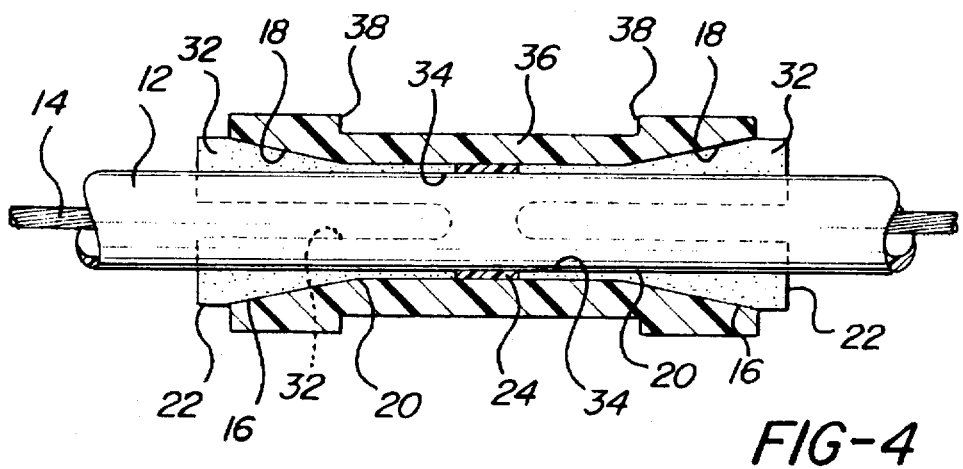
FIG. 4 is a fragmentary cross sectional view of a second embodiment.
Figure 5:
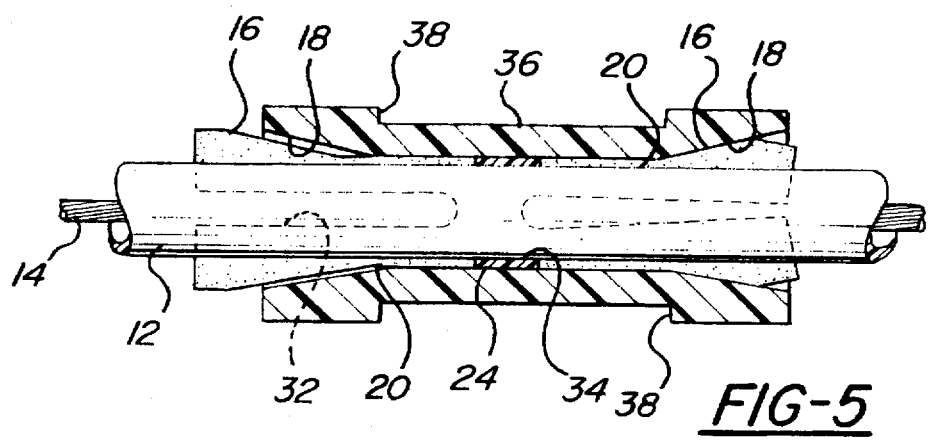
FIG. 5 is a view like FIG. 4 but showing the assembly in a gripping position.

The wedges 16 are defined by conical sections extending from adjacent small diameter ends 20 in opposite directions to large diameter ends 22. As will be appreciated, the wedges could be multi-sided as viewed in cross section instead of being conical, i.e., a pyramid. The small diameter ends 20 of the conical sections are connected together to prevent relative axial movement therebetween. In the embodiment of FIG. 4 and 5, the small diameter ends 20 of the conical sections are integrally connected together by an integral section 24 whereas in the embodiment of FIG. 1–3, the small diameter ends 20 are connected together by a snap-together connection section, generally indicated at 26 in FIG. 2, connecting the conical sections together. More specifically, the snap together section 26 includes a pair of diametrically opposed male arrowhead elements 28 which snap into female retaining recesses 30.

Each wedge 16 and ramp 18 pair includes longitudinally extending slots 32 for allowing radial movement thereof, i.e., either one of the wedge 16 and the ramp 18 of each pair includes the slots 32 for radial movement into and out of gripping engagement with a portion of the control assembly. More specifically, the conical sections have a bore 34 extending axially therethrough and surrounding the conduit 12 and each of the wedges 16 is paired with one of the ramps 18 for wedging action with that paired ramp 18 in response to an axial force applied to that paired ramp 18 to move the paired wedge 16 into radial binding engagement with the conduit 12 to prevent axial movement along the conduit 12 in the direction of the applied axial force. A collar 36 surrounds the conical sections and the ramps 18 are defined by conical female surfaces on the interior thereof at each end of the collar 36. The collar 36 defines an annular saddle between the ends thereof for attachment to and axial retention of a support bracket 40, the saddle extending between the spaced shoulders 38 adjacent the ends of the collar 36.

Figure 2:
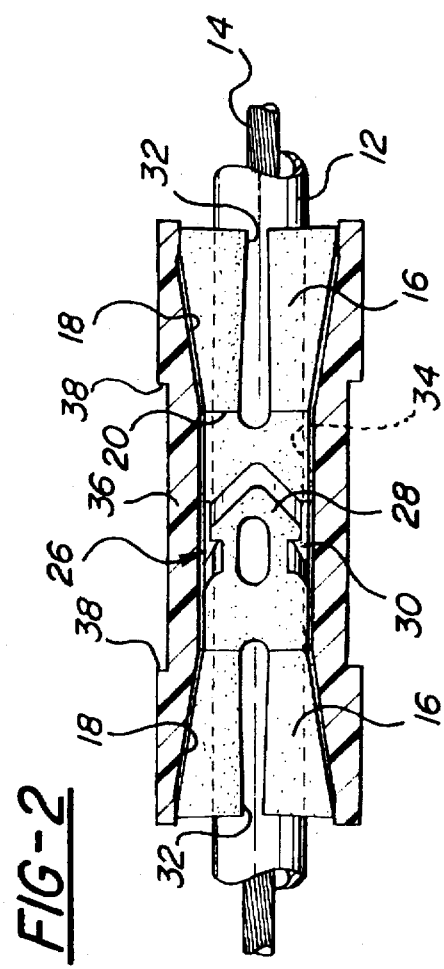
FIG. 2 is a view like FIG. 1 but showing the components assembled.
Figure 3:
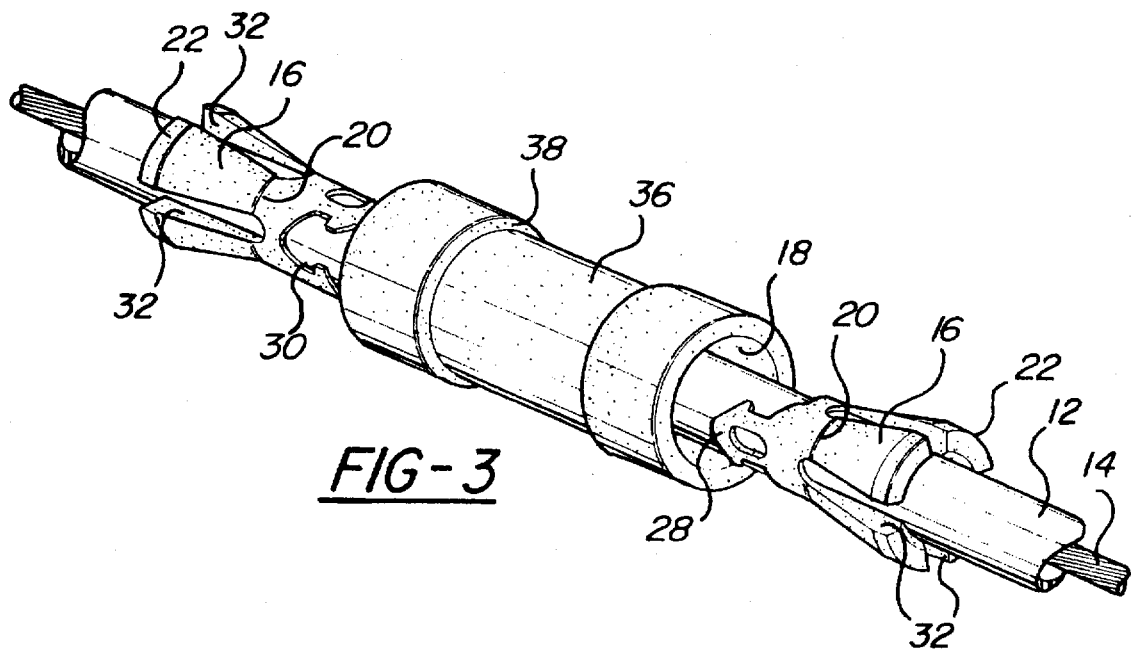
FIG. 3 is a perspective view of FIG. 1.

In the embodiment of FIGS. 1 through 3, the conical sections 16 are inserted into opposite ends of the collar 36 and snapped together with the ends of the collar radially compressing the large ends 22 ever so slightly, which is exaggerated in FIG. 2. One of the independent conical wedge sections 16 of the embodiment of FIGS. 1–3 is first slid onto the conduit 12, followed by the collar 36 and then the second conical wedge section 16 and when the conical wedge sections 16 are snapped together by the snap-in connections 28 and 30, the tolerances are such that the ramps 18 force the wedges 16 into slight gripping engagement with the conduit 12. The radial clearance shown in FIG. 2 facilitates this assembly. However, in response to axial movement of the collar relative to the conduit, or vice versa, the clearance at one end of the assembly between the conical section 16 and the female conical portion 18 is taken up and the conical section 16 is squeezed into tighter gripping engagement with the conduit. Upon movement in the opposite direction, the opposite conical section 16 is squeezed into tighter gripping engagement with the conduit. The interior of the bore 34 through the conical sections 16 may serrated, knurled, or otherwise roughened, to increase the gripping engagement with the conduit.

In the embodiment of FIGS. 4 and 5 with the integrally connected conical sections 16, the slots 32 allow the conical wedge sections 16 to contract sufficiently to be inserted into the collar 36. The tolerances of the fit of the bore 34 about the conduit 12 is such that the adjustment mechanism may be moved along the conduit 12 by a force applied directly to one end of one conical wedge section 16. However, as a longitudinal force is applied to one of the ramps 18, either by the bracket 40 or by the conduit 12, the ramp 18 moves longitudinally relative to the conical wedge section 16 and radially compresses the conical wedge section into gripping engagement with the conduit 12, as shown in FIG. 5.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly for transmitting motion in a curved path comprising:

a conduit (12) defining the longitudinal axis of said control assembly;

a motion transmitting core element (14) movably supported by said conduit (12);

an adjustment mechanism for adjustment along said conduit;

said adjustment mechanism including opposed and radially outwardly tapered wedges (16) engaging said conduit and a unitary collar (36) having oppositely disposed conical female surfaces defining a pair of ramps (18) fixed with respect to one another and in engagement with said wedges (16), each of said wedges (16) being paired with one of said ramps (18), said wedges (16) being axially movable into said collar (36) for wedging action with said ramps (18) in response to an axial force to move said wedges into radial binding engagement with said conduit, and a connection (24, 26) connecting said wedges (16) together to prevent relative axial movement therebetween to maintain said binding engagement of said wedges (16) and said conduit to prevent axial movement of said collar (36) along said conduit.

2. An assembly as set forth in claim 1 wherein said wedges (16) are defined by sections extending from adjacent small ends (20) in opposite directions to large ends (22), said sections having a bore (34) of a constant diameter extending axially therethrough and surrounding said conduit (12).

3. An assembly as set forth in claim 2 wherein each wedge includes longitudinally extending slots (32) for allowing radial expansion and contraction thereof.

4. An assembly as set forth in claim 3 wherein said sections are conical and said ramps (18) are defined by conical female surfaces at each end of said collar (36).

5. An assembly as set forth in claim 4 wherein said collar (36) defines an annular saddle (38—38) between the ends thereof for attachment to and axial retention of a support bracket (40).

6. An assembly as set forth in claim 5 wherein said conical sections are integrally connected (24) together.

7. A motion transmitting remote control assembly for transmitting motion in a curved path comprising:

a conduit (12) defining the longitudinal axis of said control assembly;

a motion transmitting core element (14) movably supported by said conduit (12);

an adjustment mechanism for adjustment along said conduit;

said adjustment mechanism including opposed and radially outwardly tapered wedges (16) engaging said conduit and a collar (36) presenting a pair of ramps (18) in engagement with said wedges (16), each of said wedges (16) being paired with one of said ramps (18) for wedging action with said ramps (18) in response to an axial force to move said wedges into radial binding engagement with said conduit, and a snap-together connection (28,30) connecting said wedges (16) together to prevent relative axial movement therebetween to maintain said radial binding engagement of said wedges (16) and said conduit to prevent axial movement of said collar (36) along said conduit.

* * * * *